(No Model.)
H. E. LEJEUNE.
LUBRICATOR.
No. 488,438. Patented Dec. 20, 1892.
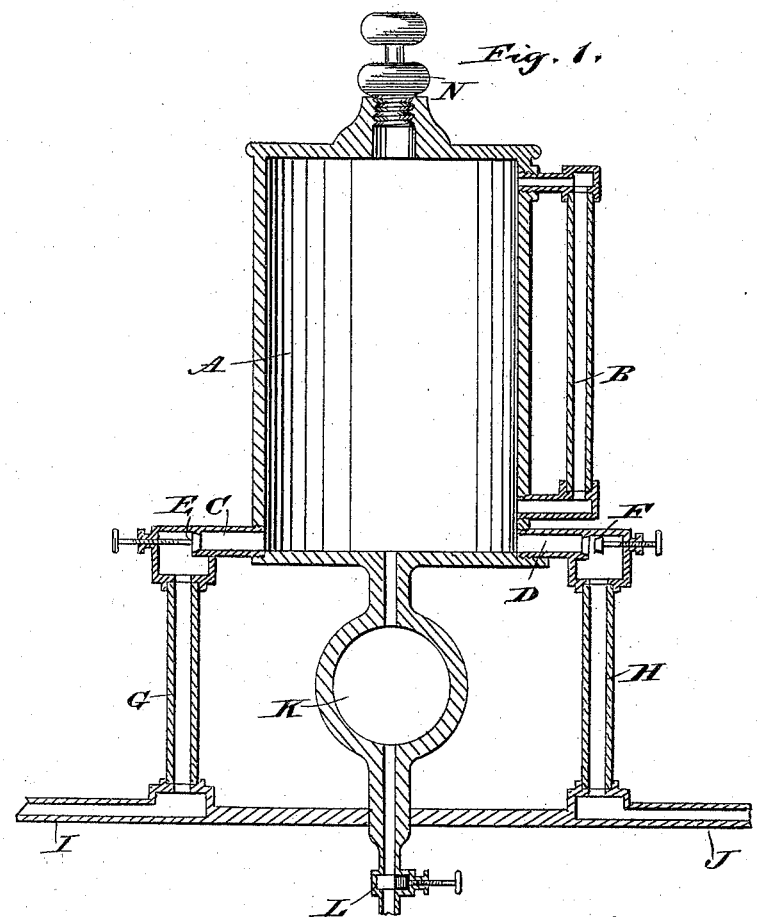
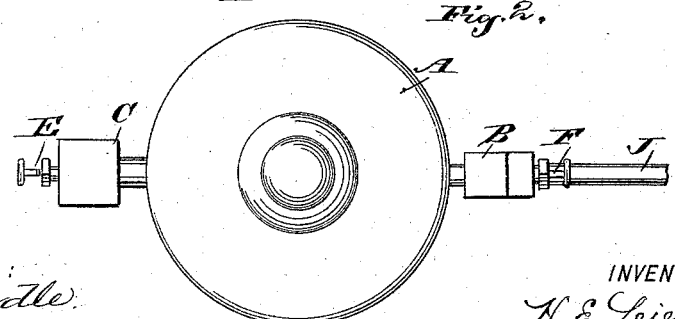
WITNESSES:
F. McArdle
C. Sedgwick
INVENTOR
H. E. Lejeune
BY
Munn & Co
ATTORNEYS.

UNITED STATES PATENT OFFICE.

HENRY ERNEST LEJEUNE, OF THIBODEAUX, LOUISIANA.

LUBRICATOR.

SPECIFICATION forming part of Letters Patent No. 488,438, dated December 20, 1892.

Application filed March 19, 1892. Serial No. 425,577. (No model.)

*To all whom it may concern:*

Be it known that I, HENRY ERNEST LEJEUNE, of Thibodeaux, in the parish of La Fourche and State of Louisiana, have invented a new and Improved Lubricator, of which the following is a full, clear, and exact description.

The object of the invention is to provide a new and improved lubricator, which is simple and durable in construction, very effective in operation, and more especially designed for use on vacuum or other pumps and machinery to oil the water cylinder.

The invention consists of a lubricant reservoir provided at its lower end with outlets leading to the ends of the cylinder to be oiled, and a water-chamber held on the under side of the reservoir and provided with a valve.

The invention also consists of certain parts and details and combinations of the same, as will be hereinafter described and then pointed out in the claims.

Reference is to be had to the accompanying drawings forming a part of this specification, in which similar letters of reference indicate corresponding parts in both the figures.

Figure 1 is a sectional side elevation of the improvement; and Fig. 2 is a plan view of the same.

The improved lubricator is provided with a suitably constructed lubricant reservoir A, provided at one side with a gage glass B, to indicate the amount of lubricant in the reservoir A. On the latter, close to the bottom of the same and preferably at opposite sides are arranged the outlet pipes C and D, having valves E and F, respectively, for controlling the amount of oil discharged from the reservoir A through the said pipes C and D. From the latter, extend downwardly, the gage glasses G and H, leading to the pipes I and J, connected with the ends of the cylinder to be oiled.

On the under side of the reservoir A is arranged a water receptacle or chamber K, in communication with the reservoir A at the bottom and provided with a valve L, at its lower end for discharging any water which may have accumulated in the said receptacle K.

The operation is as follows: The reservoir A is filled with the necessary lubricant from the top by removing a suitable cap N, screwing in the top of the said reservoir A. The valves E and F are then opened sufficiently to admit the desired quantity of lubricant to the tubes G and H, and the pipes I, J, respectively leading to the ends of the cylinder to be oiled. The glass gage B readily indicates at any time, the amount of lubricant within the reservoir A and through the glass tubes G and H the amount of oil flowing to the ends of the cylinder can readily be seen. In case water works into the reservoir A it flows into the water compartment K from which it can be readily discharged at any time by opening the valve L.

It is understood that this device is more especially designed for use on the water cylinders of vacuum pumps to automatically oil the cylinder.

It will further be seen that the device is very simple in construction, can be readily applied to any pump, and the amount of oil furnished to the cylinder can be regulated.

Having thus fully described my invention, I claim as new and desire to secure by Letters Patent,—

1. A lubricator comprising a reservoir, outlet pipes leading from the lower end of the said reservoir, and each provided with a valve, glass tubes connected with the said outlet pipes, pipes leading from the said glass tubes to the cylinder to be lubricated, and a water receptacle held on the lower end of the said reservoir and in communication with the same, substantially as shown and described.

2. A lubricator comprising a reservoir, outlet pipes leading from the lower end of the said reservoir, and each provided with a valve, glass tubes connected with the said outlet pipes, pipes leading from the said glass tubes to the cylinder to be lubricated, a water receptacle held on the lower end of the said reservoir and in communication with the same, and a valve held on the outlet of the said water receptacle to control the discharge of water from the said receptacle, substantially as shown and described.

HENRY ERNEST LEJEUNE.

Witnesses:
J. C. BERNARD,
OLIVER FLEETWOOD.